United States Patent
Moss

(10) Patent No.: US 9,824,807 B2
(45) Date of Patent: Nov. 21, 2017

(54) MAGNETIC THRUST GENERATION SYSTEM

(71) Applicant: Robert A. Moss, Saint Joseph, MI (US)

(72) Inventor: Robert A. Moss, Saint Joseph, MI (US)

(*) Notice: Subject to any disclaimer, the term of this patent is extended or adjusted under 35 U.S.C. 154(b) by 232 days.

(21) Appl. No.: 14/793,436

(22) Filed: Jul. 7, 2015

(65) Prior Publication Data

US 2017/0012520 A1 Jan. 12, 2017

(51) Int. Cl.
| | |
|---|---|
| *H01F 6/00* | (2006.01) |
| *H01F 6/06* | (2006.01) |
| *B64C 39/00* | (2006.01) |
| *B64G 1/00* | (2006.01) |
| *F03H 99/00* | (2009.01) |

(52) U.S. Cl.
CPC ............. *H01F 6/06* (2013.01); *B64C 39/00* (2013.01); *B64G 1/00* (2013.01); *F03H 99/00* (2013.01); *H01F 6/00* (2013.01)

(58) Field of Classification Search
CPC ... H01F 6/00; H01F 6/06; F03H 99/00; B64G 1/00; B64C 39/00
USPC .......................................... 335/216; 244/1 R
See application file for complete search history.

(56) References Cited

U.S. PATENT DOCUMENTS

| | | |
|---|---|---|
| 6,318,666 B1 | 11/2001 | Brotz |
| 7,446,636 B1 | 11/2008 | Below |
| 2008/0111655 A1* | 5/2008 | Wozniak ................ B60L 13/04 335/216 |

OTHER PUBLICATIONS

Mark Krinker and Alexander Bolonkin; "Magnetic propeller for uniform magnetic field levitation"; arXiv:0807.1948; Jul. 12, 2008.

* cited by examiner

*Primary Examiner* — Ramon M Barrera
(74) *Attorney, Agent, or Firm* — David S. Alavi

(57) ABSTRACT

An apparatus comprises multiple electrically conductive loops, an elongated tubular ferromagnetic shield, and an elongated tubular superconductive inner shield. The superconductive inner shield is positioned within the ferromagnetic shield. Each conductive loop includes (i) a thrust segment extending from a first end of the superconductive inner shield outside the ferromagnetic shield to a second end of the superconductive inner shield and (ii) a return segment passing through an interior passage of the superconductive inner shield from the second end of the superconductive inner shield to the first end of the superconductive inner shield. The conductive loops can be spatially arranged relative to a uniform external magnetic field so that interaction between the external magnetic field and electrical current flowing in the conductive loops results in asymmetric magnetic flux density around, and non-zero net force exerted on, the conductive loops.

26 Claims, 10 Drawing Sheets

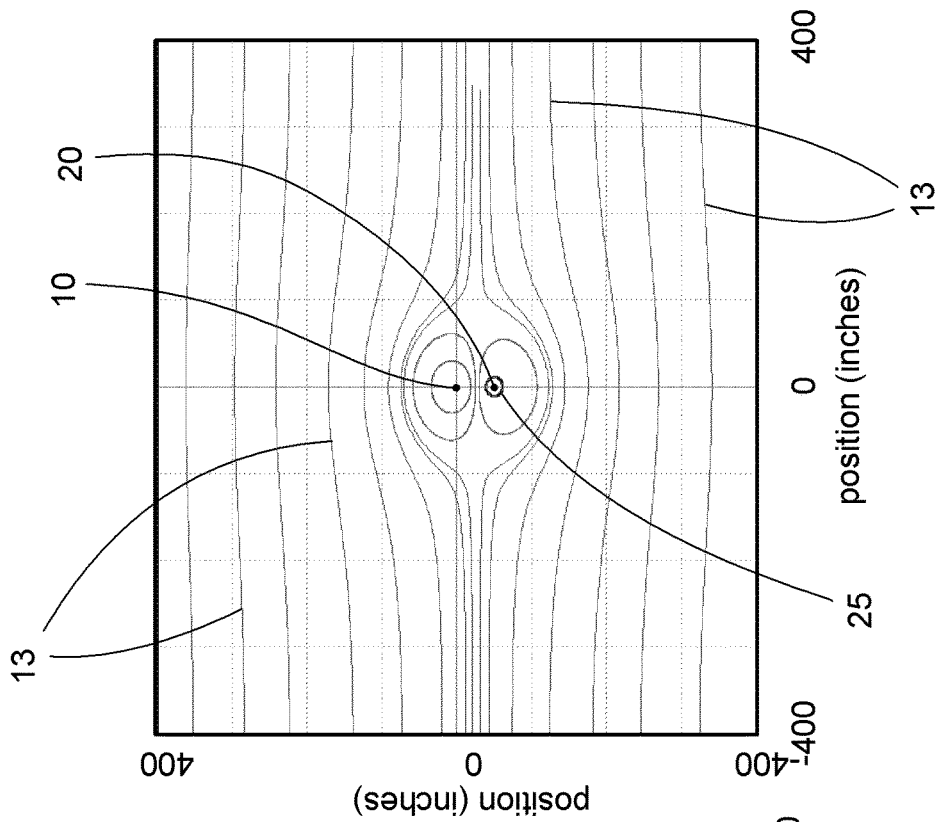
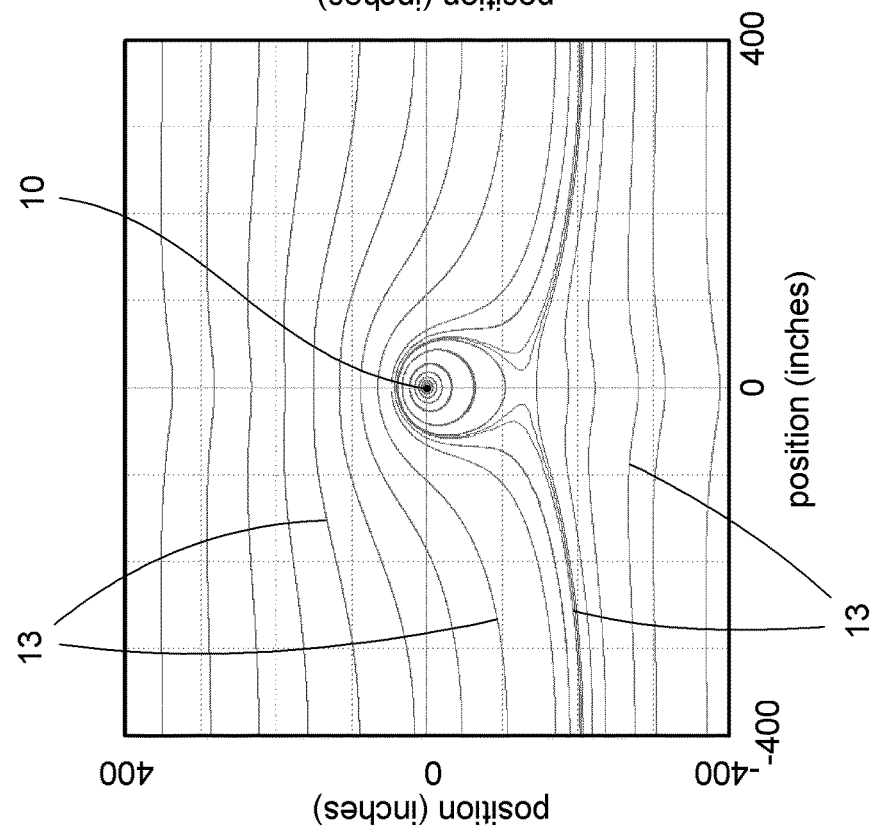

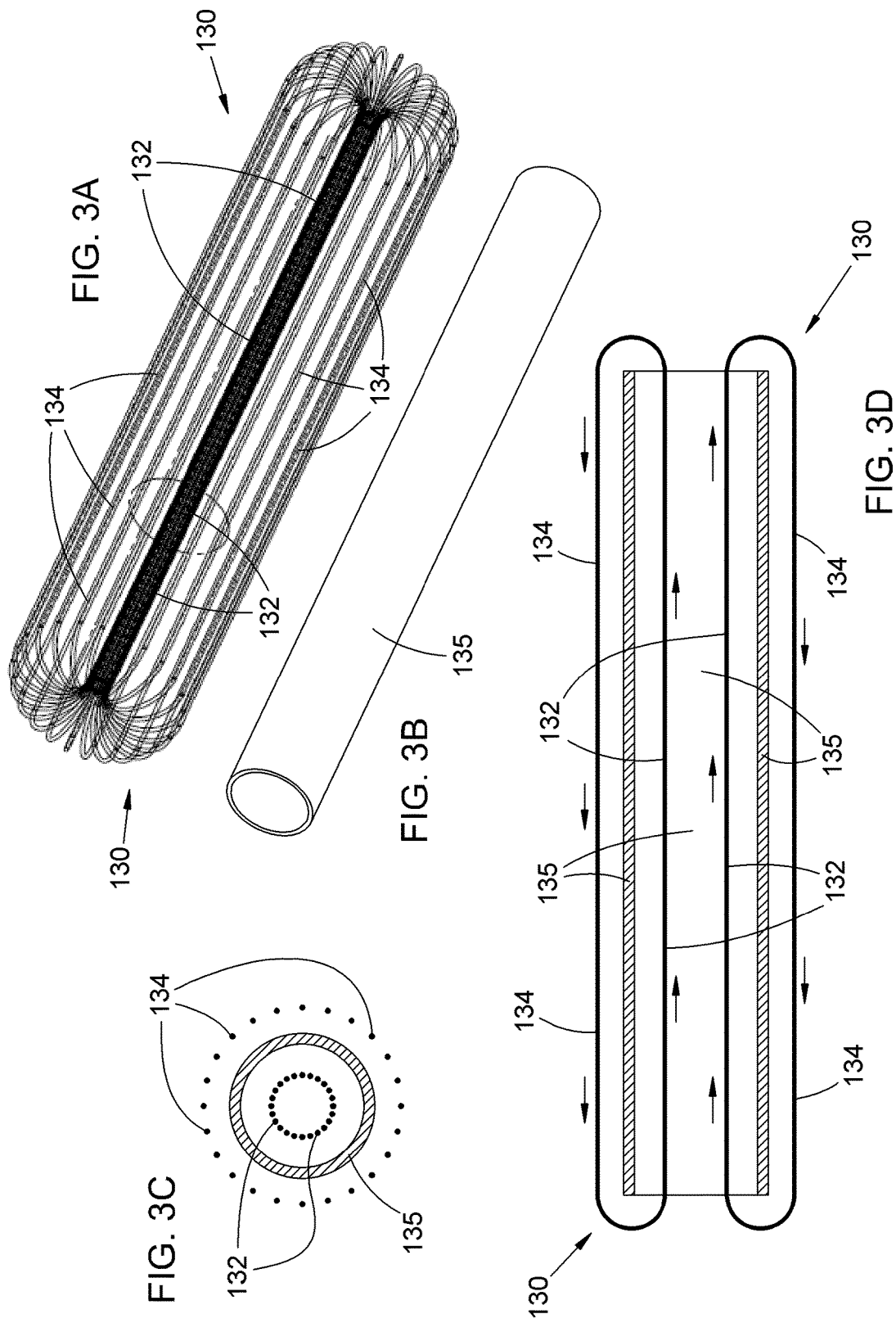

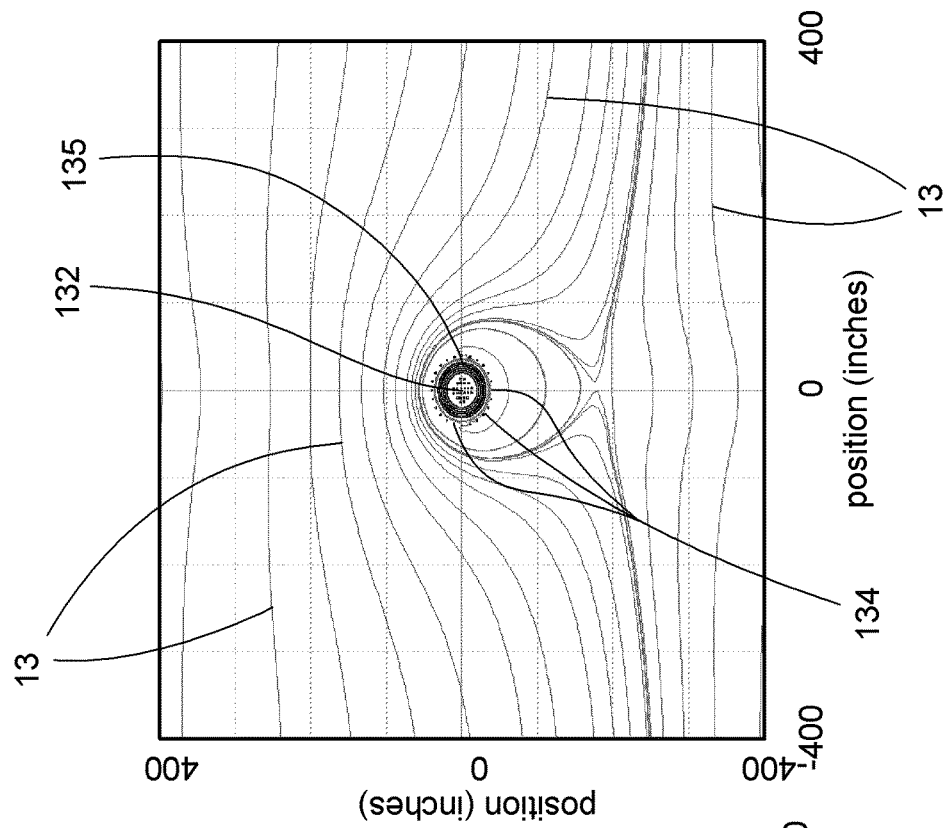
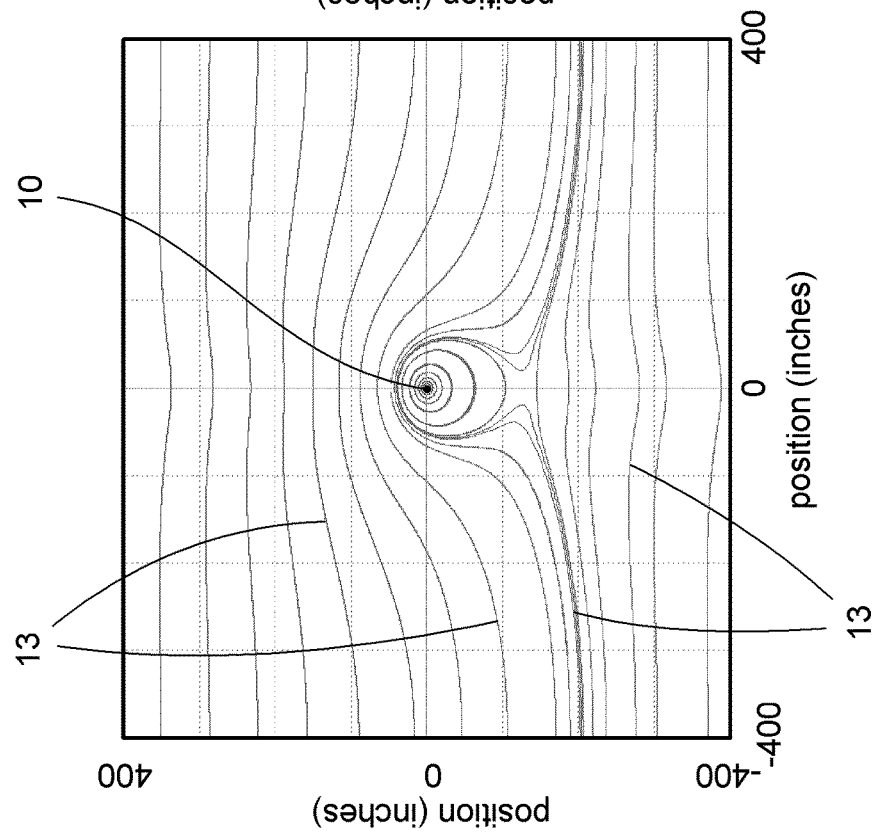
FIG. 4B
FIG. 4A

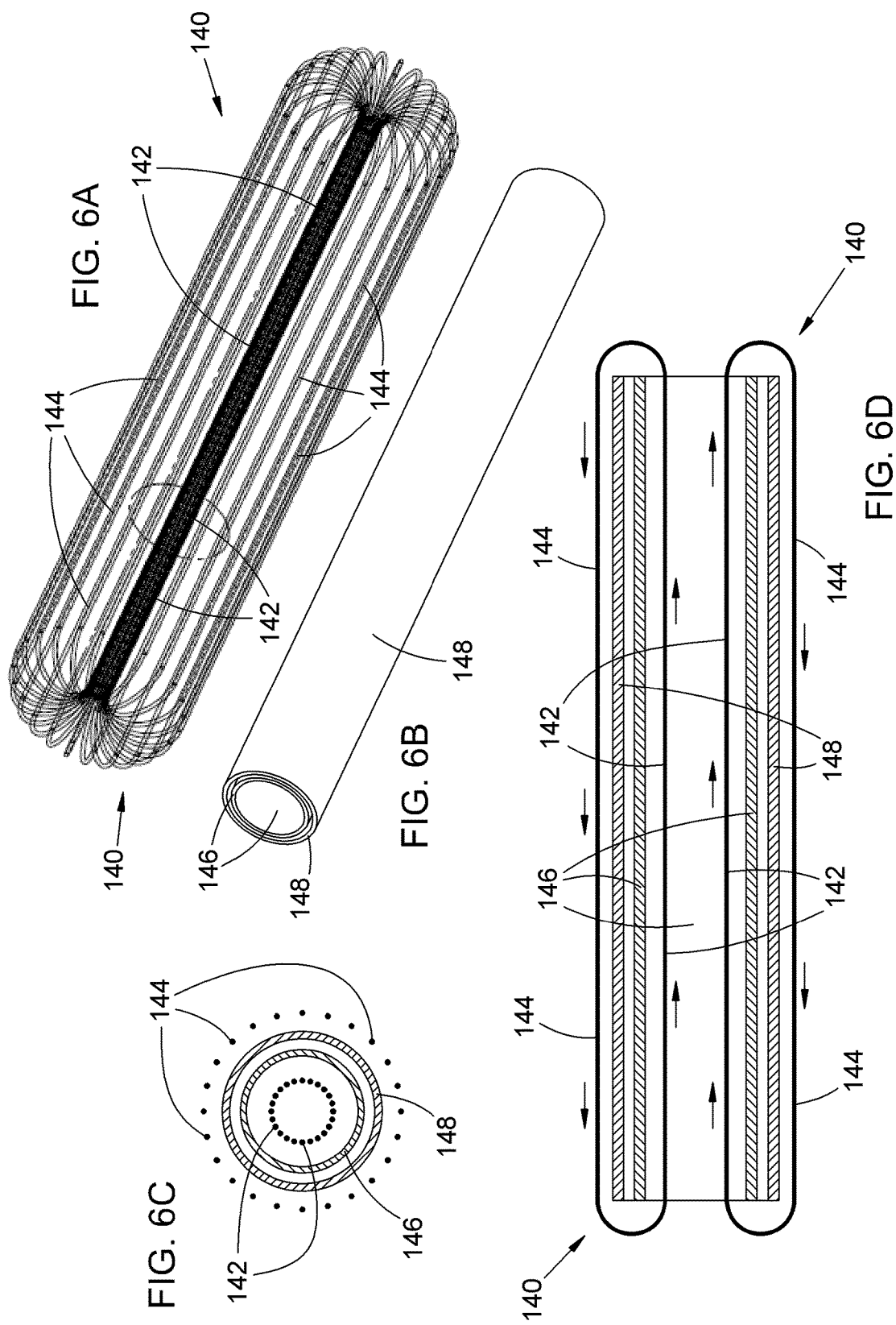

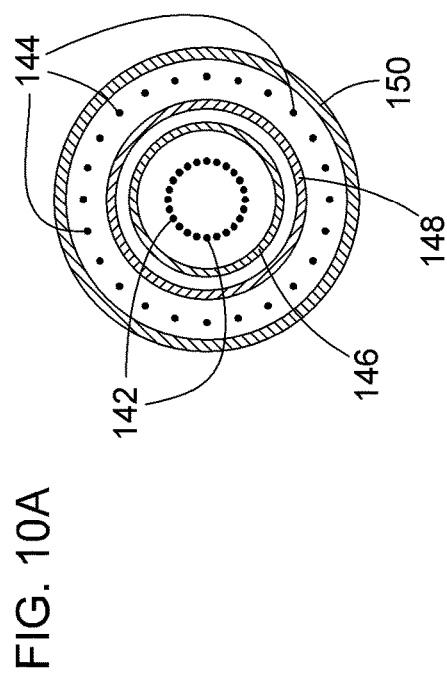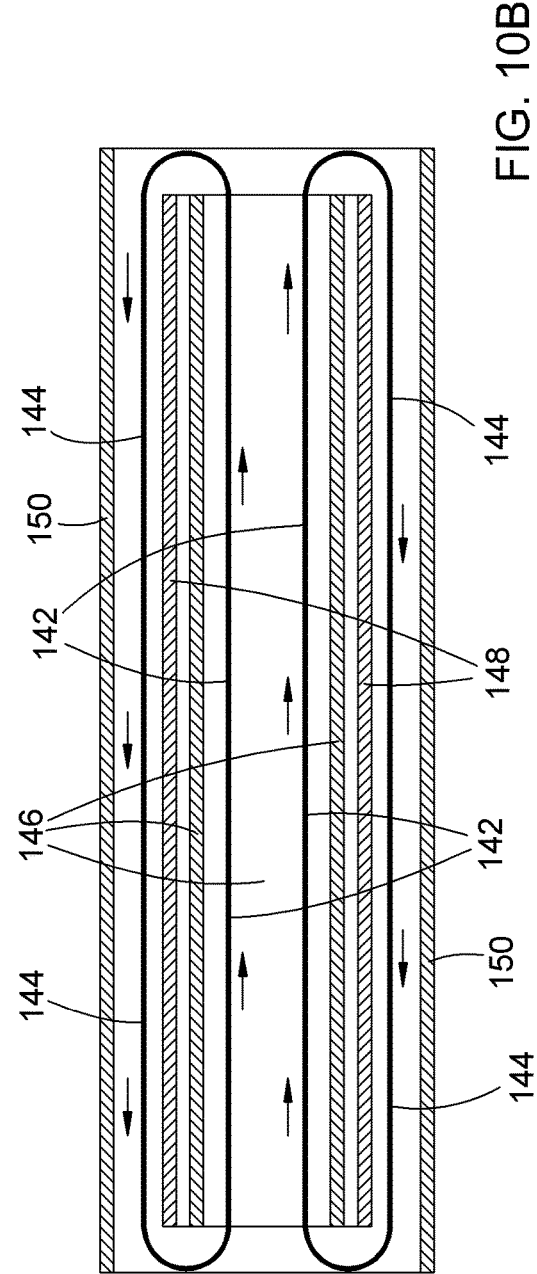

MAGNETIC THRUST GENERATION SYSTEM

FIELD OF THE INVENTION

The field of the present invention relates to magnetic thrust generation. In particular, apparatus and methods are described herein for generating thrust on a set of suitably arranged electrical-current-carrying coils immersed in an external magnetic field (e.g., earth's magnetic field).

BACKGROUND

Several systems have been proposed or developed for generating thrust or lift through interaction of one or more electrical-current-carrying conductors or superconductors with the geomagnetic field (i.e., the magnetic field of the earth). Some of these are disclosed in:

U.S. Pat. No. 7,446,636 entitled "System utilizing the earth's magnetic field to generate a force in opposition to the force of gravity" issued Nov. 4, 2008 to Below;

U.S. Pat. No. 6,318,666 entitled "Superconductive Geomagnetic craft" issued Nov. 20, 2001 to Brotz; and Mark Krinker and Alexander Bolonkin; "Magnetic propeller for uniform magnetic field levitation"; arXiv: 0807.1948; 12 Jul. 2008.

SUMMARY

An apparatus comprises a set of two or more electrically conductive loops, an elongated tubular ferromagnetic shield, and an elongated tubular superconductive inner shield. The superconductive inner shield is positioned within the ferromagnetic shield. Each conductive loop of the set is structurally arranged so as to define a conductive pathway that includes (i) a thrust segment extending from a first end of the superconductive inner shield outside the ferromagnetic shield to a second end of the superconductive inner shield and (ii) a return segment passing through an interior passage of the superconductive inner shield from the second end of the superconductive inner shield to the first end of the superconductive inner shield. Electric current flows in the same direction in all the thrust segments. The conductive loops of the set can be spatially arranged relative to a substantially uniform external magnetic field so that interaction between the external magnetic field and electrical current flowing in the conductive loops of the set results in an asymmetric magnetic flux density around, and a non-zero net force exerted on, the set of conductive loops.

Objects and advantages pertaining to magnetic thrust generation may become apparent upon referring to the example embodiments illustrated in the drawings or disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A shows calculated magnetic field lines arising from a single unshielded current-carrying wire (1000 A into the plane of the figure) immersed in a uniform external magnetic field (50 µT left to right in the plane of the figure); FIG. 2B shows calculated magnetic field lines arising from a single unshielded current-carrying wire (1000 A into the plane of the figure) and a single parallel ferromagnetically shielded current-carrying wire (1000 A out of the plane of the figure) immersed in a uniform external magnetic field (50 µT left to right in the plane of the figure).

FIG. 3A is a schematic perspective view of a set of multiple conductive loops in a toroidal arrangement. FIG. 3B is a schematic perspective view of an elongated tubular ferromagnetic or superconducting shield. FIGS. 3C and 3D are transverse and longitudinal cross-sectional views, respectively, of the multiple conductive loops in a toroidal arrangement around the tubular shield.

FIG. 4A shows calculated magnetic field lines arising from a single unshielded current-carrying wire (1000 A into the plane of the figure) immersed in a uniform external magnetic field (50 µT left to right in the plane of the figure); FIG. 4B shows calculated magnetic field lines arising from the arrangement of FIGS. 3C and 3D (24 loops; 1500 A per loop; current into the plane of the figure outside the shield; current out of the plane of the figure inside the shield; ferromagnetic tubular shield) immersed in a uniform external magnetic field (50 µT left to right in the plane of the figure).

FIG. 6A is a schematic perspective view of a set of multiple conductive loops in a toroidal arrangement. FIG. 6B is a schematic perspective view of an elongated tubular superconducting shield inside an elongated tubular ferromagnetic shield. FIGS. 6C and 6D are transverse and longitudinal cross-sectional views, respectively, of the multiple conductive loops in a toroidal arrangement around the ferromagnetic and superconductive tubular shields.

FIGS. 10A and 10B are transverse and longitudinal cross-sectional views, respectively, of the multiple conductive loops in a toroidal arrangement around the ferromagnetic and superconductive tubular shields, all inside an elongated tubular superconductive outer shield.

It should be noted that the embodiments depicted in this disclosure are shown only schematically, and that not all features may be shown in full detail or in proper proportion. Certain features or structures may be exaggerated relative to others for clarity. It should be noted further that the embodiments shown are exemplary only, and should not be construed as limiting the scope of the written description or appended claims.

DETAILED DESCRIPTION OF EMBODIMENTS

Modeling disclosed herein of magnetic field lines and the forces arising from distortion of those field lines has been undertaken using Magnetic Finite Element Modelling.

Figure 1B:
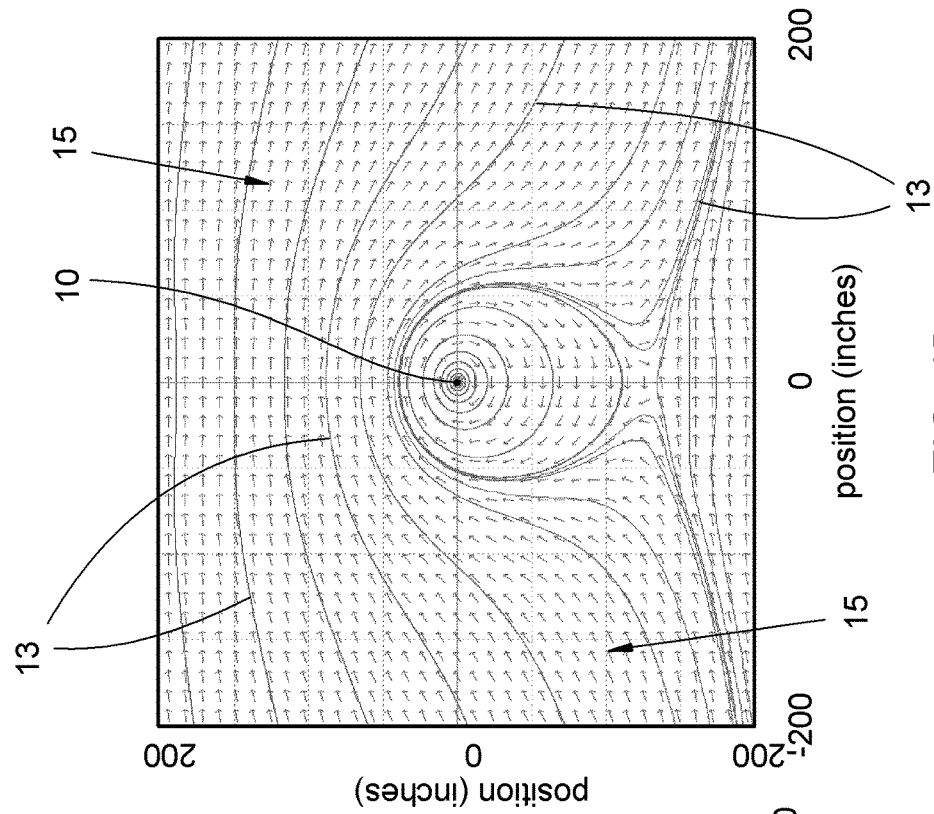
FIGS. 1A and 1B show calculated magnetic field lines arising from a single unshielded current-carrying wire (1000 A into the plane of the figure) immersed in a uniform external magnetic field (50 µT left to right in the plane of the figure).
Figure 1A:
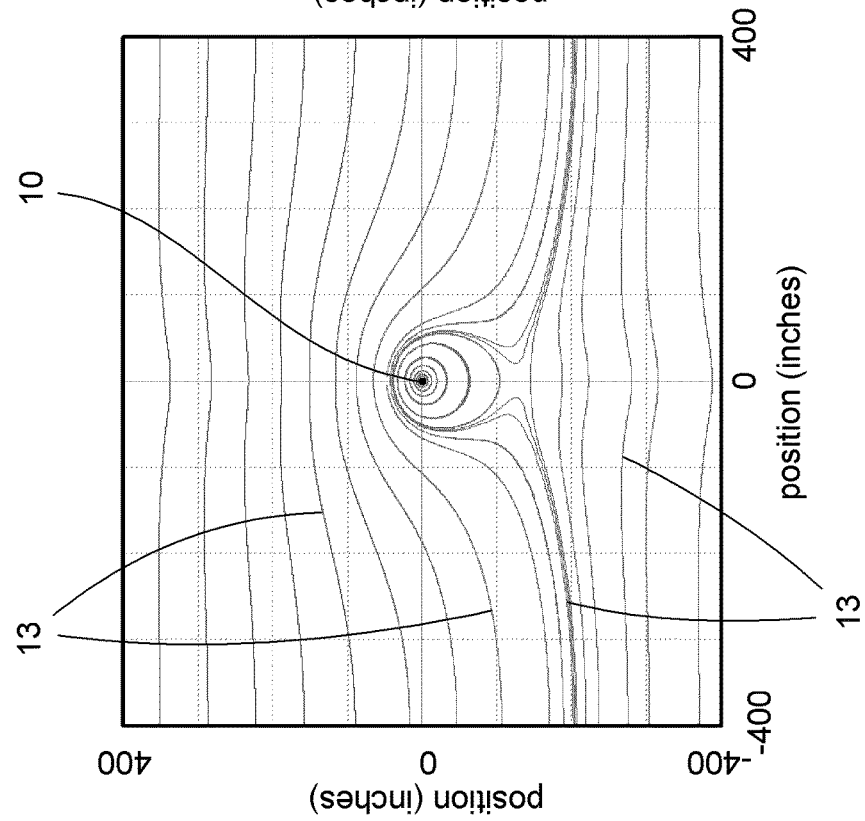

FIGS. 1A and 1B illustrate schematically the magnetic field lines 13 and magnetic field vectors 15 arising from a current (1000 A) flowing through a wire 10 immersed in a substantially uniform external magnetic field (50 µT, which approximates the strength of earth's magnetic field to within about a factor of two). The view of FIGS. 1A and 1B is along the wire 10 (i.e., with the wire 10 shown in transverse cross section), with the current flowing into the plane of the figure and with the external magnetic field pointing from left to right in the plane of the figure. The current in the wire 10 distorts the magnetic field lines 13 asymmetrically, which gives rise to a lateral force on a wire of length L carrying a current $I$ of $F=I \cdot L \cdot B \cdot \sin \theta$ where $\theta$ is the angle between the wire 10 and the external magnetic field B and the force F is perpendicular to both the external magnetic field B and the wire 10 and obeys the right-hand rule. Maximum thrust is generated when the wire 10 is perpendicular to the external magnetic field B. As shown in FIGS. 1A and 1B, the force F is directed downward in the plane of the figure (i.e., away from areas of increased magnetic flux density) and is about 0.05 N per meter of wire length. This simple model is the benchmark against which other thrust-generating schemes disclosed herein are compared.

The arrangement of FIGS. 1A and 1B does not represent a practical solution for generating thrust from an external magnetic field (e.g., the earth's magnetic field). Current must flow in a closed circuit, so a second wire (the "return wire") must be present with a return current flowing in the opposite direction of the current flowing in the wire 10 (i.e., the "thrust wire"). The return current in the return wire generates force equal to and opposite of that generated by the thrust wire 10 and cancels the thrust. Apparatus and methods disclosed or claimed herein address this thrust-cancellation problem.

Attempts have been made to shield the return wire from the external magnetic field in the hopes of reducing the forces generated by the return current and thereby creating a "virtual single wire." For example, U.S. Pat. No. 7,446,636 to Below (hereinafter, the '636 patent) discloses an example in which half of the conductive loop is surrounded by ferromagnetic shielding. Such an example is illustrated schematically in FIG. 2B (FIG. 2A is the same as FIG. 1A and is shown for side-by-side comparison). A return wire 20 is arranged substantially parallel to the thrust wire 10; the wires 10 and 20 (along with a current source) form a closed loop, so that the same current magnitude flows through both wires, but in opposite directions (current in thrust wire 10 directed into the plane of the figure; current in return wire 20 directed out of the plane of the figure). An elongated tubular ferromagnetic shield 25 with $\mu=5000$ (e.g., comprising so-called "mu-metal" according to the '636 patent) surrounds the return wire 20 and is intended to shield the return wire 20 from the external magnetic field. However, while the ferromagnetic shield 25 may shield the return wire 20 from the external magnetic field, the field lines 13 are still distorted to about the same degree regardless of the presence of the ferromagnetic shield 25. The field distortion arising from current flowing in the return wire 20 still generates a lateral force that substantially cancels the lateral force generated by the thrust wire 10. Current flowing in the single closed loop with an unshielded thrust portion 10 and a shielded return portion 20 appears to generate little or no net lateral force arising from interaction the external magnetic field and current flowing in the loop, the disclosure of the '636 patent notwithstanding.

In another example from the '636 patent (illustrated schematically in FIGS. 3A-3D), multiple conductive loops 130 are disclosed in a toroidal arrangement. Current directions are shown by the arrows in FIG. 3C. The return wire segments 132 of all the loops 130 are routed through an interior passage of an elongated tubular ferromagnetic shield 135 ($\mu=5000$). Thrust segments 134 of all the loops 130 are routed along the exterior of the ferromagnetic shield 135. The resulting calculated magnetic field distortion (50 µT external field) is illustrated schematically in FIG. 4B (FIG. 4A is the same as FIG. 1A and is provided for side-by-side comparison). Currents in the thrust segments 134 are into the plane of the figure and currents in the return segments 132 are out of the plane of the figure. Field distortion (with resulting lateral thrust) similar to that shown in FIG. 4A (with 1000 A flowing in a single unshielded wire 10) can be achieved, but requires more than 30 times more total current flowing through the "virtual single wire" (e.g., 1500 A flowing through each one of 24 loops 130 for total current of 36,000 A flowing through the "virtual single wire" made up of the thrust segments 134 of all the loops 130). An equal total return current must flow through the interior passage of the tubular ferromagnetic shield 135 in the return segments 132 of all the loops 130. The loops 130 can be coupled in parallel or in series with a current source, but connection in series may be preferred as requiring less current from the source to achieve the desired total current through all of the thrust segments 134.

Figure 5B:
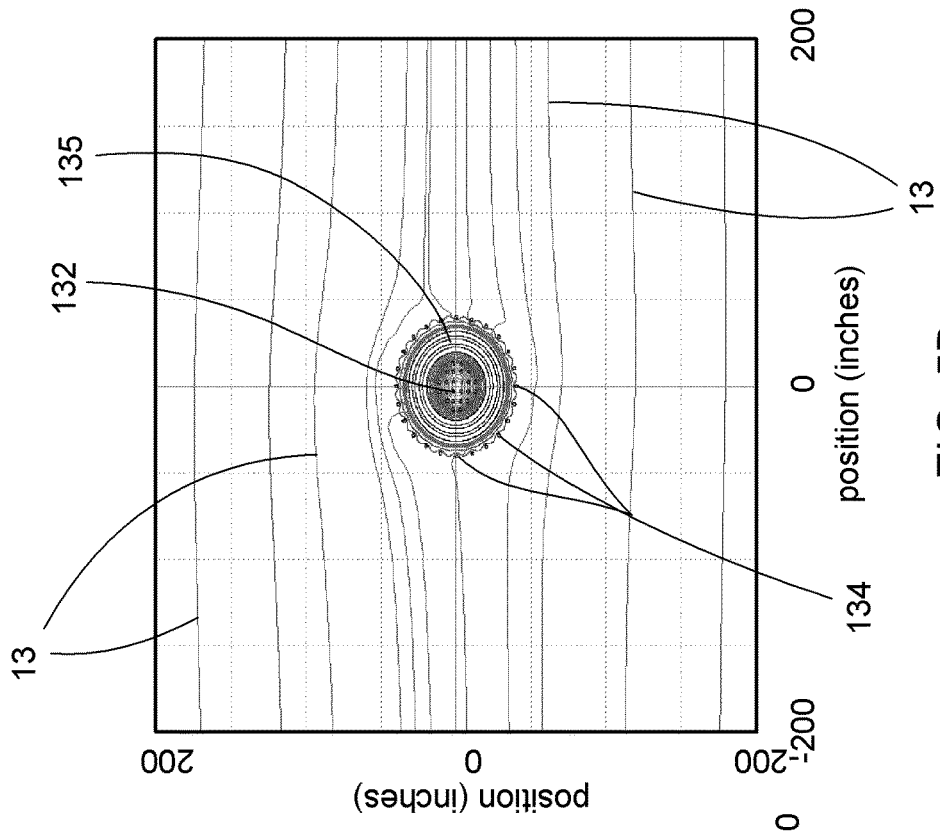
FIG. 5B shows calculated magnetic field lines arising from the arrangement of FIGS. 3C and 3D (24 loops; 1500 A per loop; current into the plane of the figure outside the shield; current out of the plane of the figure inside the shield; superconducting tubular shield) immersed in a uniform external magnetic field (50 µT left to right in the plane of the figure).
Figure 5A:
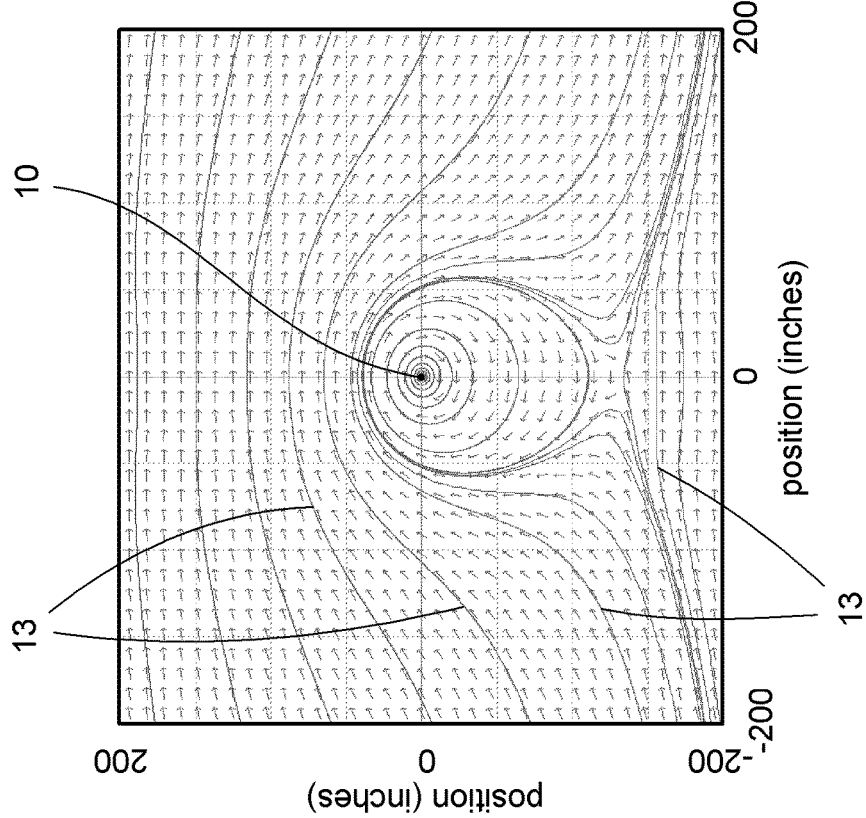
FIG. 5A shows calculated magnetic field lines arising from a single unshielded current-carrying wire (1000 A into the plane of the figure) immersed in a uniform external magnetic field (50 µT left to right in the plane of the figure)

Another "virtual single wire" example arranged according to FIGS. 3A-3D was modeled in which the tubular shield 135 was superconducting instead of ferromagnetic (e.g., constructed from any suitable metallic, alloy, ceramic, or other superconducting material, such as BSCCO, BPSCCO, YBCO, NbTi, $MgB_2$, or other one or more suitable superconductive materials; shielding factor on the order of $10^6$ or more through exclusion of magnetic field lines from the superconducting material due to the Meissner effect). The resulting field distortions are illustrated schematically in FIG. 5B (FIG. 5A is the same as FIG. 1B and is provided for side-by-side comparison). Somewhat surprisingly, 36,000 A of total current flowing in the thrust segments 134 (1500 A per loop in 24 loops) results in little or no distortion or asymmetry of the external field, and little or no net lateral thrust.

An example of an inventive magnetic thrust apparatus is illustrated schematically in FIGS. 6A-6D. Current directions are indicated by the arrows in FIG. 6. The arrangement of the conductive loops 140 is similar to that of FIGS. 3A-3D, but there are two elongated tubular shields 146 and 148. An elongated tubular superconductive inner shield 146 (e.g., constructed from any suitable metallic, alloy, ceramic, or other superconducting material, such as BSCCO, BPSCCO, YBCO, NbTi, MgB$_2$, or other one or more suitable superconductive materials; shielding factor on the order of $10^6$ or more) lies within an interior passage of an elongated tubular ferromagnetic shield 148 (e.g., constructed from a ferromagnetic material such as iron or "mu metal" or other one or more suitable ferromagnetic materials; μ on the order of $10^3$ or more). The return segments 142 of all the conductive loops 140 pass through the interior passage of the superconductive inner shield 146; the thrust segments 144 of all the conductive loops 140 pass outside the ferromagnetic shield 148.

Figure 7B:
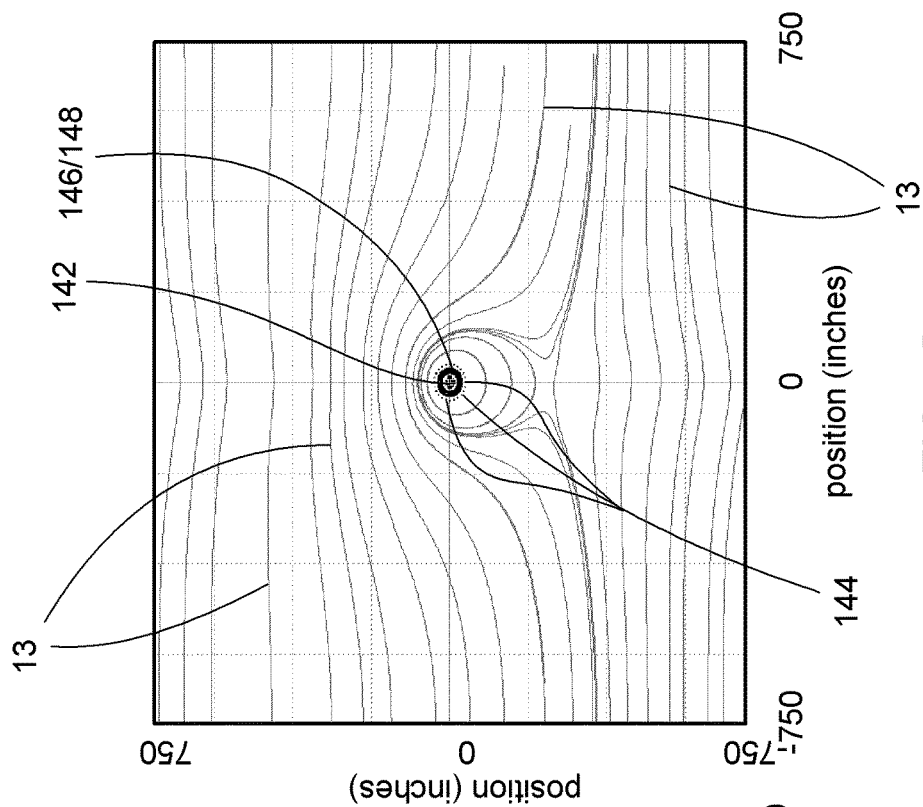
FIG. 7B shows calculated magnetic field lines arising from the arrangement of FIGS. 6C and 6D (24 loops; 100 A per loop; current into the plane of the figure outside the shields; current out of the plane of the figure inside the shields) immersed in a uniform external magnetic field (50 µT left to right in the plane of the figure).
Figure 7A:
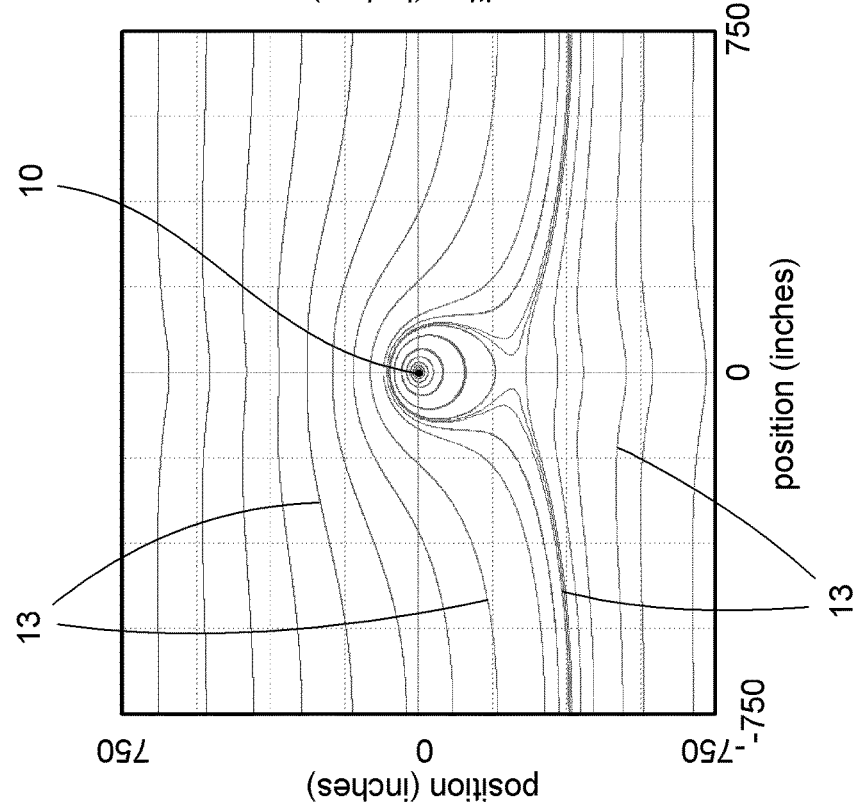
FIG. 7A shows calculated magnetic field lines arising from a single unshielded current-carrying wire (2400 A into the plane of the figure) immersed in a uniform external magnetic field (50 µT left to right in the plane of the figure)

The resulting field distortions are illustrated schematically in FIG. 7B (FIG. 7A is similar to FIG. 1A, except that the current in the wire 10 is 2400 A, and is provided for side-by-side comparison). Currents in the thrust segments 144 are into the plane of the figure and currents in the return segments 142 are out of the plane of the figure. FIGS. 7A and 7B show similar distortion and asymmetry of the magnetic field lines 13 (and therefore similar lateral thrust). The total current in all the thrust segments 144 is 2400 A (100 A in each of 24 loops 140 in this example), which is the same as the current carried by the single wire 10 in FIG. 7A. The resulting force (in a 50 μT external magnetic field) is about 0.12 N per meter of wire 10 for FIG. 7A, and about 0.113 N per meter of the shields 146/148 for FIG. 7B. It appears the inventive combination of the superconductive inner shield 146 within the ferromagnetic shield 148 results in the desired "single virtual wire" behavior that has been sought to provide a mechanism for generating magnetic thrust using the earth's magnetic field. The thrust force appears to behave linearly with respect to current for total current in all the thrust segments 144 up to at least 72,000 A (i.e., about 3.4 N per meter of the shields 146/148 in FIG. 7B, versus about 3.6 N/m of the single wire 10 in FIG. 7A).

The conductive loops 140 of the inventive magnetic thrust apparatus can be connected to an electric current source in parallel or in series; connecting in series may be preferred so as to reduce the magnitude of current provided by the current source while achieving the desired total current through all of the thrust segments 144 (i.e., source current multiplied by the number of thrust segment 144). Employing superconducting materials for the conductive loops 140 may be preferred to enable large currents with reduced or minimal source voltage and to eliminate energy loss through resistive heat loss in the loops 140. It may be desirable to initiate current flow in the superconductive loops 140 and maintain that current as a persistent current. Any suitable one or more superconductive materials can be employed (e.g., any suitable metallic, alloy, ceramic, or other superconducting material, such as BSCCO, BPSCCO, YBCO, NbTi, MgB$_2$, or other one or more suitable superconductive materials). Care should be taken that the magnetic fields arising from the conductive loops remain below the critical magnetic field level $H_C$ characteristic of the superconductive material being used. The inventive apparatus can include a cooling system operatively coupled to each superconductive loop 140 of the set and operable to maintain the loops 140 at or below the temperature at which the loop material exhibits superconductivity. Such a system typically includes a cryostat 160 or other suitably insulated housing to contain the superconductive loops, and liquid helium, liquid nitrogen, or other suitable refrigerant. The same cooling system can also serve to maintain the superconductive inner housing 146 at or below the temperature at which its material exhibits superconductivity, or a separate cooling system can be provided for that purpose.

Figure 8:
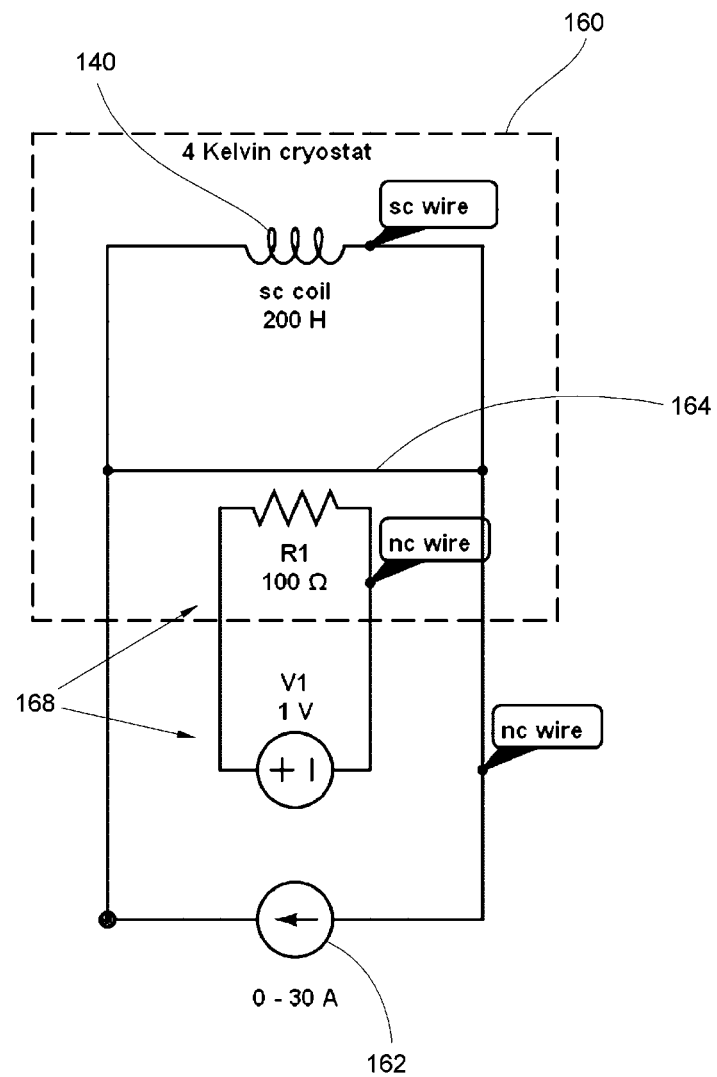
FIG. 8 is a schematic diagram of a circuit for establishing a persistent electric current in a superconductive loop.

A switching mechanism can be employed to cause electrical current to flow in the superconductive loops in persistent mode, i.e., to flow nearly indefinitely around a closed superconductive loop without the need for an external power supply or current source; an example is shown in FIG. 8. The set of superconductive loops 140 exhibits a self-inductance of about 200 H and is coupled to a low-voltage current source 162 (up to 30 A at 1 V). A superconductive wire segment 164 is connected to the current source in parallel with the loops 140. A resistive heater 168 is arranged to supply a small amount of heat (ca. 10 mW) to the superconductive wire segment 164. The segment 164 is heated by the heater 168 to remain above its superconducting temperature while the current source 162 is ramped up to maintain the non-zero resistance of wire segment 164, then the heater 168 is turned off. Any voltage drop across the segment 164 during ramp-up arises from the self-inductance of the loops 140, but goes to zero once maximum current is reached and the current through the loops 140 stops changing. The segment 164 then quickly drops to below its superconducting temperature and becomes superconducting. A closed superconducting circuit now exists that includes the loops 140 and wire segment 164. The current source 162 can be disconnected or ramped down and turn off, leaving a persistent current circulating through the loops 140 and the segment 164. Other suitable switching or magnetic coupling mechanisms can be employed for establishing a persistent current through the loops 140.

The persistent current remains constant only when the set of conductive loops remains stationary with respect to the external magnetic field; acceleration, deceleration, or other movement of the set of conductive loops due to the non-zero net force exerted by the external magnetic field results in energy dissipation and reduction of the current flowing in the superconductive loops 140. In some examples an external power supply or current source can be employed to maintain a substantially constant current flowing through the loops 140 as they move. However, some current lost during acceleration of the loops 140 can be recovered by reversing the orientation of the loops 140 relative to the external magnetic field, thereby creating reverse thrust relative to the direction of motion and consequent deceleration. In some instances this can reduce the need for additional power to maintain the desired level of persistent current flowing in the superconductive loops 140.

The inventive magnetic thrust apparatus of FIGS. 6A-6D can be placed in a substantially uniform external magnetic field (such as the earth's magnetic field at a given location on the earth's surface) and oriented with its axis (i.e., the long axes of the tubular shields 146/148) at any desired orientation to that external field. Note that the earth's magnetic field (i.e., the geomagnetic field) is not uniform in magnitude or direction over the entire surface of the earth. However, over the length scale of typical dimensions of the inventive apparatus disclosed herein (from a few tenths of a meter up to several tens or a few hundreds of meters), the earth's magnetic field can be regarded as substantially uniform. The geomagnetic field is (i) directed generally from south to north (deviating from that direction at a given location by the magnetic declination), (ii) substantially horizontal near the equator, (iii) directed at an increasing downward angle the farther north of the equator one travels (positive magnetic dip), and (iv) directed at an increasing upward angle the farther south of the equator one travels (negative magnetic dip). The magnitude of the geomagnetic field varies from about 25 μT to about 65 μT across the earth's surface.

Thrust can be generated in any direction perpendicular to the external magnetic field; no component of thrust can be generated parallel to the external magnetic field. Thrust components in the horizontal plane (north-south and east-west) are most relevant for geomagnetic propulsion. Those facts impose restrictions or limitations when using the inventive arrangement of conductive loops 140 for geomagnetic propulsion. At the equator, where the geomagnetic field is substantially horizontal, thrust can be generated having a vertical component and an approximately east-west horizontal component, but no approximately north-south component. Maximum east-west thrust is achieved by orienting the elongated tubular shields 146/148 (which corresponds to the current direction in through the thrust segments 144 of the loops 140) substantially vertically. Inverting the direction of current flow in the loops 140 (by mechanically flipping the loops over or by electronically switching the current direction within the loops; flipping the loops over may be desirable if persistent current is employed) reverses the direction of the thrust.

With increasing distance from the equator, the magnitude of the vertical component of the geomagnetic field increases (increasing positive or negative magnetic dip, depending on whether one is north or south of the equator). An ideal, but only hypothetical, situation for geomagnetic propulsion (albeit undesirable for magnetic compass navigation) would be a vertical geomagnetic field. The tubular shields 146/148 and the conductive loops 140 would be most advantageously oriented horizontally (i.e., perpendicular to the hypothetical vertical geomagnetic field) to generate maximum thrust, and could be rotated about a vertical axis to be oriented perpendicular to the desired thrust direction. In reality, the dip angle across much of the contiguous United States ranges between about 60° and about 70°. Orienting the loops 140 horizontally in an east-west direction yields the maximum available north-south thrust (reduced from the maximum total thrust by a factor of the cosine of the dip angle). Orienting the loops 140 perpendicular to the geomagnetic field in a north-south vertical plane results in maximum thrust, which is directed in an east-west direction. Intermediate orientations of the shields 146/148 and the loops 140 can be readily calculated that result in maximum available horizontal thrust in any desired compass direction for a given dip angle. In any orientation, reversal of the current direction (by physical movement or electrical reversal) results in reversal of the thrust. The geomagnetic thrust can be employed in conjunction with a steering mechanism of the vessel or vehicle to propel the vessel or vehicle in a range of directions. For example, the rudder of a water-borne vessel can be employed to direct the vessel in a direction that is not parallel to the direction of the geomagnetic propulsion force produced by the set of conductive loops 140, much in the way a sailing ship's rudder can direct the ship along a course that is not parallel to, and even somewhat against, the wind direction. Only the component of the force on the set of conductive loops 140 that is parallel to the direction of movement would be effective to propel the vessel in that direction; the orthogonal component would push the vessel laterally, analogous to leeway of a sailing vessel.

Figure 9A:
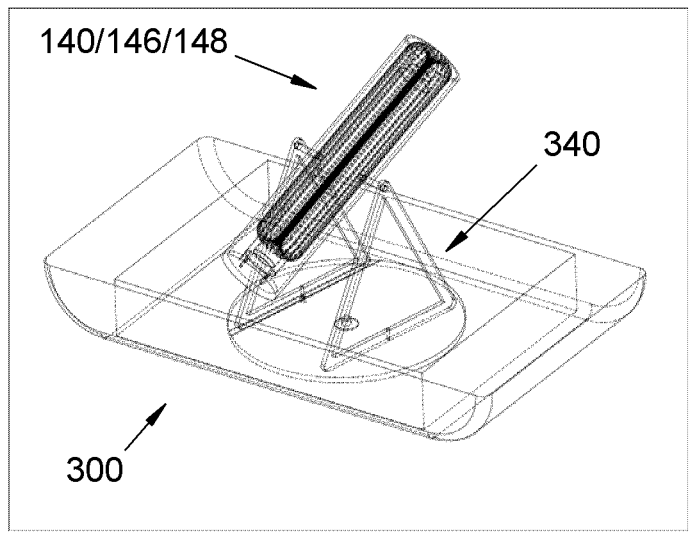
FIGS. 9A-9C are schematic perspective views of the set of conductive loops of FIGS. 6A-6D mounted on a water-borne vessel in varying orientations.
Figure 9B:
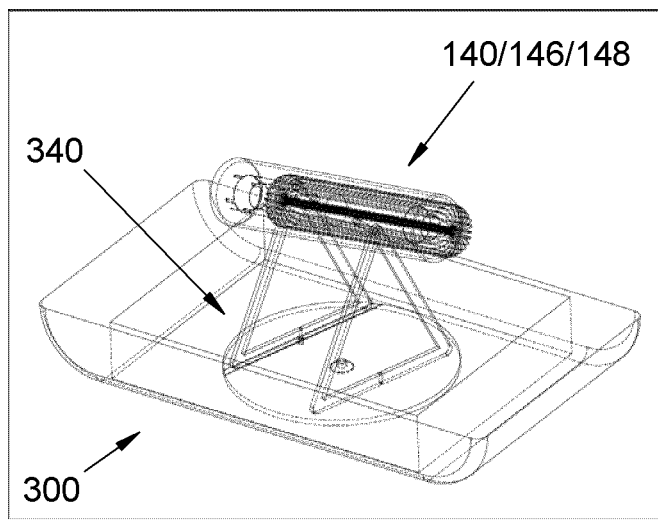
Figure 9C:
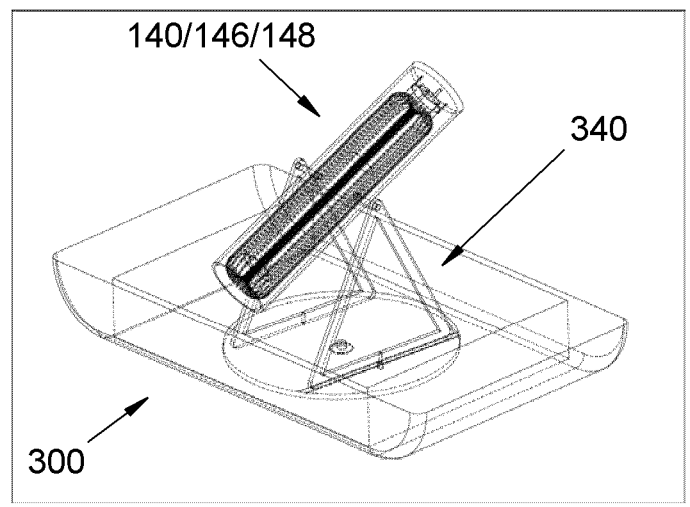

The set of conductive loops 140 can be mounted on an object to be propelled, e.g., a water-borne vessel 300 or a land-borne vehicle. The mount 340 can be arranged to be connected to the water-borne vessel 300 or the land-borne vehicle so as to (i) enable variable orientation of the conductive loops 140 with respect to the external magnetic field and (ii) to transmit to the vessel or the vehicle the non-zero net force exerted by the external magnetic field on the conductive loops 140. With the conductive loops 140 suitably oriented, the non-zero net force exerted by the external magnetic field (e.g., the geomagnetic field) acts to propel the vessel or vehicle. An optimum orientation for the loops 140 can be readily calculated to provide thrust in the desired direction, as described above. Orienting the tubular shields 146/148 and the loops 140 parallel to the magnetic field results in no net thrust on the vessel or vehicle. An example of a mounting of the loops 140 and shields 146/148 in a variety of orientations on a water-borne vessel 300 are illustrated schematically in FIGS. 9A-9C. Any suitable mechanism or joint can be employed in the mount 340 for enabling rotation about one or more axes of the set of conductive loops 140 relative to the vessel or vehicle. Examples of suitable mechanisms or joints can include, but are not limited to, one or more axles, one or more universal joints, one or more hinges, one or more articulated joints, one or more gimbals, combinations thereof, or functional equivalents thereof.

Whatever the details of the mount 340 and the types of motion permitted, the propulsion system can further comprise one or more actuators structured and connected to alter the orientation of the set of conductive loops 140 relative to the vessel or vehicle. Any suitable one or more actuators can be employed; examples can include, but are not limited to, one or more electric motors, one or more servo motors or stepper motors, one or more hydraulic or pneumatic pistons, one or more gears, belts, pulleys, or chains, combinations thereof, or functional equivalents thereof. The propulsion system typically can also include a controller operatively coupled to the one or more actuators so as to enable controlled alteration of the orientation of the set of conductive loops 140 relative to the vessel or vehicle. The controller can be electronic, mechanical, software-based, or a combination thereof. In order to maintain the desired thrust direction exerted by the geomagnetic field, the orientation of the set of conductive loops 140 can be continuously adjusted to correct for minor deviations from the desired orientation. To that end, the controller for the actuator can include a feedback mechanism for maintaining the orientation of the set of conductive loops within an acceptable angular range of the desired orientation, e.g., within ±2°, ±5°, ±10°, or other required or desired angular range. In addition to controlling the one or more actuators, the feedback mechanism can also be operatively coupled to other drive or steering mechanisms of the vessel or vehicle, e.g., to one or more rudders or directional thrusters, to maintain the orientation of the set of conductive loops 140 within a desired angular range relative to the external magnetic field, e.g., the geomagnetic field.

The geomagnetic propulsion systems disclosed herein can be advantageously employed to drive a water-borne vessel. One or more of size (i.e., lengths of the tubular shields 146/148), number of loops 140, or magnitude of the current flowing through the loops 140 can be varied as needed or desired to scale the geomagnetic propulsion system up or down to suit a particular vessel in a particular use environment. Under certain conditions, the overall efficiency of the geomagnetic propulsion system can compare favorably to that of conventional, propeller-driven craft. In particular, that comparison is favorable for geomagnetic propulsion in situations wherein the vessel moves at relatively low velocities (at which propellers tend to be less efficient) or a large fraction of the transmit time is spent accelerating or decelerating. Houseboats and ferries are an example of water-borne vessels that typically operate under such conditions.

There may be instances when thrust is not needed and when the magnetic fields produced by the conductive loops 140 are inconvenient or undesirable, e.g., when a vessel is docked near other vessels. An elongated tubular superconductive outer shield 150 (FIGS. 10A and 10B) can be employed to contain the magnetic fields produced by the conductive loops 140 (and eliminate the generated thrust) without altering the current flowing through the loops 140. That capability can be of particular utility when the loops 140 are superconductive and have a persistent current flowing through them; it would be desirable to maintain that persistent current as long as practicable, once it is established. The tubular outer shield 150 can comprise any suitable superconductive material, including examples already disclosed herein. The conductive loops 140 and the shields 146 and 148 can be positioned within the interior passage of the tubular outer shield 150. When the outer shield is not in a superconducting state, it does not attenuate or otherwise affect the magnetic fields produced by current flowing in the loops 140. When the outer shield is cooled to below its superconducting transition temperature and becomes superconducting, the magnetic fields within its interior passage are nearly completely attenuated before exiting the passage; the superconductive outer shield 150 substantially completely blocks the magnetic fields produced by the current flow through loops 140, even when that current still flows. A suitable cooling system (insulated container, refrigerant, and so forth, as described above) can be operatively coupled to the outer shield 150 to control emanation of magnetic fields generated by the loops 140. Operating the cooling system to cool the outer shield 150 to below its superconducting temperature effectively "turns off" the magnetic fields of the loops 140 outside the outer shield 150 and the thrust they generate. Turning off the cooling system and allowing the outer shield 150 to warm up to above its superconducting temperature "turns on" the magnetic fields of the loops 140 outside the outer shield 150 and restores the thrust generated by interaction of those fields with the geomagnetic field.

In an alternative arrangement that enables the thrust generated by the current flowing in the loops 140 to be turned on and off without altering that current, the cooling system for the superconductive inner shield 146 can be used to move the temperature of the superconductive inner shield 146 above or below its superconducting temperature. With the inner superconductive shield 146 below its superconducting temperature, the superconductive inner shield 146 acts as described above and shown in FIG. 7B, and the current flowing through the loops 140 generates thrust as described above. With the inner superconductive shield 146 above its superconducting temperature, it has little or no effect on the magnetic field lines, which appear similar to those of FIG. 4B and generate substantially reduced thrust compared to the field lines of FIG. 7B.

In addition to the preceding, the following examples fall within the scope of the present disclosure or appended claims:

EXAMPLE 1

An apparatus comprising a set of two or more electrically conductive loops, an elongated tubular ferromagnetic shield, and an elongated tubular superconductive inner shield, wherein: (a) the superconductive inner shield is positioned within an interior passage of the ferromagnetic shield; (b) each conductive loop of the set is structurally arranged so as to define a conductive pathway that includes (i) a thrust segment extending from a first end of the superconductive inner shield outside the ferromagnetic shield to a second end of the superconductive inner shield and (ii) a return segment passing through an interior passage of the superconductive inner shield from the second end of the superconductive inner shield to the first end of the superconductive inner shield; and (c) the set of conductive loops is arranged so that electrical current flows in the same direction in the thrust segments of the loops of the set.

EXAMPLE 2

The apparatus of Example 1 wherein the set of conductive loops is spatially arranged relative to a substantially uniform external magnetic field so that interaction between the external magnetic field and electric current flowing in the conductive loops results in an asymmetric magnetic flux density around, and a non-zero net force exerted on, the set of conductive loops.

EXAMPLE 3

The apparatus of any one of Examples 1 or 2 further comprising an electrical current source operatively coupled to the set of conductive loops to cause electrical current to flow in the conductive loops.

EXAMPLE 4

The apparatus of Example 3 wherein the electrical current source is arranged so as to maintain substantially constant current flow in the conductive loops during movement, acceleration, or deceleration of the apparatus relative to the external magnetic field.

EXAMPLE 5

The apparatus of any one of Examples 1 through 4 further comprising a cooling system operable to maintain the superconductive inner shield at or below a temperature at which the superconductive shield exhibits superconductivity.

EXAMPLE 6

The apparatus of Example 5 wherein the cooling system is further operable to allow the superconductive inner shield to remain above the temperature at which the superconductive shield exhibits superconductivity.

EXAMPLE 7

The apparatus of any one of Examples 1 through 6 wherein the conductive loops are connected to one another in series.

EXAMPLE 8

The apparatus of any one of Examples 1 through 7 wherein the set of conductive loops comprises a set of superconductive loops.

EXAMPLE 9

The apparatus of Example 8 further comprising a cooling system operatively coupled to the set of superconductive loops and operable to maintain the superconductive loops at or below a temperature at which the superconductive loops exhibit superconductivity.

EXAMPLE 10

The apparatus of any one of Examples 8 or 9 further comprising an electrical current source operatively coupled to the set of superconductive loops to cause electrical current to flow in the superconductive loops, and a switching or magnetic coupling mechanism arranged to cause the electrical current to flow in persistent mode in the superconductive loops.

EXAMPLE 11

The apparatus of any one of Examples 2 through 10 further comprising an elongated tubular superconductive outer shield and an outer shield cooling system operatively coupled to the superconductive outer shield, wherein: (a) the set of conductive loops, the ferromagnetic shield, and the superconductive inner shield are positioned within an interior passage of the superconductive outer shield; (b) with the cooling system set to maintain the superconductive outer shield at or below a temperature at which the superconductive outer shield exhibits superconductivity, interaction between the external magnetic field and electric current flowing in the conductive loops of the set results in only negligible asymmetry of magnetic flux density around, and only negligible net force exerted on, the set of conductive loops; and (c) with the superconductive outer shield at or above a temperature at which the superconductive outer shield does not exhibit superconductivity, interaction between the external magnetic field and electric current flowing in the conductive loops of the set results in the asymmetric magnetic flux density around, and the non-zero net force exerted on, the set of conductive loops.

EXAMPLE 12

The apparatus of any one of Examples 2 through 11 further comprising a mount connected to the set of conductive loops, wherein the mount is arranged to be connected to a water-borne vessel or a land-borne vehicle and to the set of conductive loops so as to (i) enable variable orientation of the set of conductive loops with respect to the external magnetic field or with respect to the vessel or vehicle and (ii) transmit to the vessel or vehicle the non-zero net force exerted on the set of conductive loops.

EXAMPLE 13

The apparatus of Example 12 further comprising one or more actuators structured and connected to alter the orientation of the set of conductive loops relative to the external magnetic field or to the vessel or vehicle.

EXAMPLE 14

The apparatus of Example 13 further comprising a controller operatively coupled to the one or more actuators so as to enable controlled alteration of the orientation of the set of conductive loops relative to the external magnetic field or to the vessel or vehicle.

EXAMPLE 15

The apparatus of Example 14 wherein the controller includes a feedback mechanism arranged so as to maintain within a selected range orientation of the set of conductive loops relative to the external magnetic field or to the vessel or vehicle.

EXAMPLE 16

The apparatus of any one of Examples 12 through 15 further comprising the vessel or the vehicle, wherein (i) the external magnetic field is earth's magnetic field and (ii) the set of conductive loops and the mount are arranged so that the non-zero net force propels the vessel or the vehicle.

EXAMPLE 17

The apparatus of any one of Examples 2 through 16 wherein the nonzero net force per unit length of the superconductive inner shield is larger than or about equal to 10% of a net force per unit length calculated for a single unshielded wire immersed in the external magnetic field and carrying an electrical current equal to a sum of electrical currents flowing through all the thrust segments of the set of conductive loops.

EXAMPLE 18

The apparatus of any one of Examples 2 through 16 wherein the nonzero net force per unit length of the superconductive inner shield is larger than or about equal to 50% of a net force per unit length calculated for a single unshielded wire immersed in the external magnetic field and carrying an electrical current equal to a sum of electrical currents flowing through all the thrust segments of the set of conductive loops.

EXAMPLE 19

The apparatus of any one of Examples 2 through 16 wherein the nonzero net force per unit length of the superconductive inner shield is larger than or about equal to 90% of a net force per unit length calculated for a single unshielded wire immersed in the external magnetic field and carrying an electrical current equal to a sum of electrical currents flowing through all the thrust segments of the set of conductive loops.

EXAMPLE 20

The apparatus of any one of Examples 2 through 19 wherein a total current of about 2400 A flowing through all the thrust segments of the set of conductive loops, with the thrust segments oriented substantially perpendicular to earth's magnetic field, results in a net force arising from interaction with the earth's magnetic field of greater than about 0.05 N per meter of length of the superconductive and ferromagnetic shields.

EXAMPLE 21

A method using the apparatus of any one of Examples 3 through 20, the method comprising: (1) using the electrical current source operatively coupled to the set of electrically conductive loops, causing electrical current to flow through the conductive loops of the set; and (2) spatially arranging, relative to the substantially uniform external magnetic field, the conductive loops of the set so that interaction between the external magnetic field and electric current flowing in the conductive loops of the set results in the asymmetric magnetic flux density around and the non-zero net force exerted on the set of two or more conductive loops.

EXAMPLE 22

The method of Example 21 wherein the external magnetic field is earth's magnetic field.

EXAMPLE 23

The method of any one of Examples 21 or 22 wherein current flow in the conductive loops of the set decreases during movement or acceleration of the apparatus relative to the external magnetic field.

EXAMPLE 24

The method of any one of Examples 21 through 23 wherein current flow in the conductive loops of the set increases during deceleration of the apparatus relative to the external magnetic field.

EXAMPLE 25

The method of any one of Examples 21 or 22 further comprising maintaining, with the electrical current source, substantially constant current flow in the conductive loops of the set during movement, acceleration, or deceleration of the apparatus relative to the external magnetic field.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise.

In the appended claims, if the provisions of 35 USC §112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An apparatus comprising a set of two or more electrically conductive loops, an elongated tubular ferromagnetic shield, and an elongated tubular superconductive inner shield, wherein:
   (a) the superconductive inner shield is positioned within an interior passage of the ferromagnetic shield;
   (b) each conductive loop of the set is structurally arranged so as to define a conductive pathway that includes (i) a thrust segment extending from a first end of the superconductive inner shield outside the ferromagnetic shield to a second end of the superconductive inner shield and (ii) a return segment passing through an interior passage of the superconductive inner shield from the second end of the superconductive inner shield to the first end of the superconductive inner shield; and
   (c) the set of conductive loops is arranged so that electrical current flows in the same direction in the thrust segments of the loops of the set.

2. The apparatus of claim 1 further comprising an electrical current source operatively coupled to the set of conductive loops to cause electrical current to flow in the conductive loops.

3. The apparatus of claim 1 further comprising a cooling system operable to maintain the superconductive inner shield at or below a temperature at which the superconductive shield exhibits superconductivity.

4. The apparatus of claim 3 wherein the cooling system is further operable to allow the superconductive inner shield to remain above the temperature at which the superconductive shield exhibits superconductivity.

5. The apparatus of claim 1 wherein the conductive loops are connected to one another in series.

6. The apparatus of claim 1 wherein the set of conductive loops comprises a set of superconductive loops.

7. The apparatus of claim 6 further comprising a cooling system operatively coupled to the set of superconductive loops and operable to maintain the superconductive loops at or below a temperature at which the superconductive loops exhibit superconductivity.

8. The apparatus of claim 6 further comprising an electrical current source operatively coupled to the set of superconductive loops to cause electrical current to flow in the superconductive loops, and a switching or magnetic coupling mechanism arranged to cause the electrical current to flow in persistent mode in the superconductive loops.

9. The apparatus of claim 1 wherein the set of conductive loops is spatially arranged relative to a substantially uniform external magnetic field so that interaction between the external magnetic field and electric current flowing in the conductive loops results in an asymmetric magnetic flux density around, and a non-zero net force exerted on, the set of conductive loops.

10. The apparatus of claim 9 further comprising an electrical current source operatively coupled to the set of conductive loops to cause electrical current to flow in the conductive loops.

11. The apparatus of claim 10 wherein the electrical current source is arranged so as to maintain substantially constant current flow in the conductive loops during movement, acceleration, or deceleration of the apparatus relative to the external magnetic field.

12. The apparatus of claim 9 further comprising an elongated tubular superconductive outer shield and an outer shield cooling system operatively coupled to the superconductive outer shield, wherein:
  (a) the set of conductive loops, the ferromagnetic shield, and the superconductive inner shield are positioned within an interior passage of the superconductive outer shield;
  (b) with the cooling system set to maintain the superconductive outer shield at or below a temperature at which the superconductive outer shield exhibits superconductivity, interaction between the external magnetic field and electric current flowing in the conductive loops of the set results in only negligible asymmetry of magnetic flux density around, and only negligible net force exerted on, the set of conductive loops; and
  (c) with the superconductive outer shield at or above a temperature at which the superconductive outer shield does not exhibit superconductivity, interaction between the external magnetic field and electric current flowing in the conductive loops of the set results in the asymmetric magnetic flux density around, and the non-zero net force exerted on, the set of conductive loops.

13. The apparatus of claim 9 further comprising a mount connected to the set of conductive loops, wherein the mount is arranged to be connected to a water-borne vessel or a land-borne vehicle and to the set of conductive loops so as to (i) enable variable orientation of the set of conductive loops with respect to the external magnetic field or with respect to the vessel or vehicle and (ii) transmit to the vessel or vehicle the non-zero net force exerted on the set of conductive loops.

14. The apparatus of claim 13 further comprising one or more actuators structured and connected to alter the orientation of the set of conductive loops relative to the external magnetic field or to the vessel or vehicle.

15. The apparatus of claim 14 further comprising a controller operatively coupled to the one or more actuators so as to enable controlled alteration of the orientation of the set of conductive loops relative to the external magnetic field or to the vessel or vehicle.

16. The apparatus of claim 15 wherein the controller includes a feedback mechanism arranged so as to maintain within a selected range orientation of the set of conductive loops relative to the external magnetic field or to the vessel or vehicle.

17. The apparatus of claim 13 further comprising the vessel or the vehicle, wherein (i) the external magnetic field is earth's magnetic field and (ii) the set of conductive loops and the mount are arranged so that the non-zero net force propels the vessel or the vehicle.

18. The apparatus of claim 9 wherein the nonzero net force per unit length of the superconductive inner shield is larger than or about equal to 10% of a net force per unit length calculated for a single unshielded wire immersed in the external magnetic field and carrying an electrical current equal to a sum of electrical currents flowing through all the thrust segments of the set of conductive loops.

19. The apparatus of claim 9 wherein the nonzero net force per unit length of the superconductive inner shield is larger than or about equal to 50% of a net force per unit length calculated for a single unshielded wire immersed in the external magnetic field and carrying an electrical current equal to a sum of electrical currents flowing through all the thrust segments of the set of conductive loops.

20. The apparatus of claim 9 wherein the nonzero net force per unit length of the superconductive inner shield is larger than or about equal to 90% of a net force per unit length calculated for a single unshielded wire immersed in the external magnetic field and carrying an electrical current equal to a sum of electrical currents flowing through all the thrust segments of the set of conductive loops.

21. The apparatus of claim 9 wherein the external magnetic field is earth's magnetic field, and a total current of about 2400 A flowing through all the thrust segments of the set of conductive loops, with the thrust segments oriented substantially perpendicular to earth's magnetic field, results in a net force arising from interaction with the earth's magnetic field of greater than about 0.05 N per meter of length of the superconductive and ferromagnetic shields.

22. A method using the apparatus of claim 9, the method comprising:
  (a) causing electrical current to flow through the conductive loops of the set; and
  (b) spatially arranging, relative to the substantially uniform external magnetic field, the conductive loops of the set so that interaction between the external magnetic field and electric current flowing in the conductive loops of the set results in the asymmetric magnetic flux density around and the non-zero net force exerted on the set of two or more conductive loops.

23. The method of claim 22 wherein the external magnetic field is earth's magnetic field.

24. The method of claim 22 wherein current flow in the conductive loops of the set decreases during movement or acceleration of the apparatus relative to the external magnetic field.

25. The method of claim 22 wherein current flow in the conductive loops of the set increases during deceleration of the apparatus relative to the external magnetic field.

26. The method of claim 22 further comprising maintaining, with an electrical current source, substantially constant current flow in the conductive loops of the set during movement, acceleration, or deceleration of the apparatus relative to the external magnetic field.

* * * * *